No. 884,506. PATENTED APR. 14, 1908.
T. LÄRN.
METHOD OF MAKING BODIES FOR WAX MATCHES.
APPLICATION FILED APR. 13, 1907.
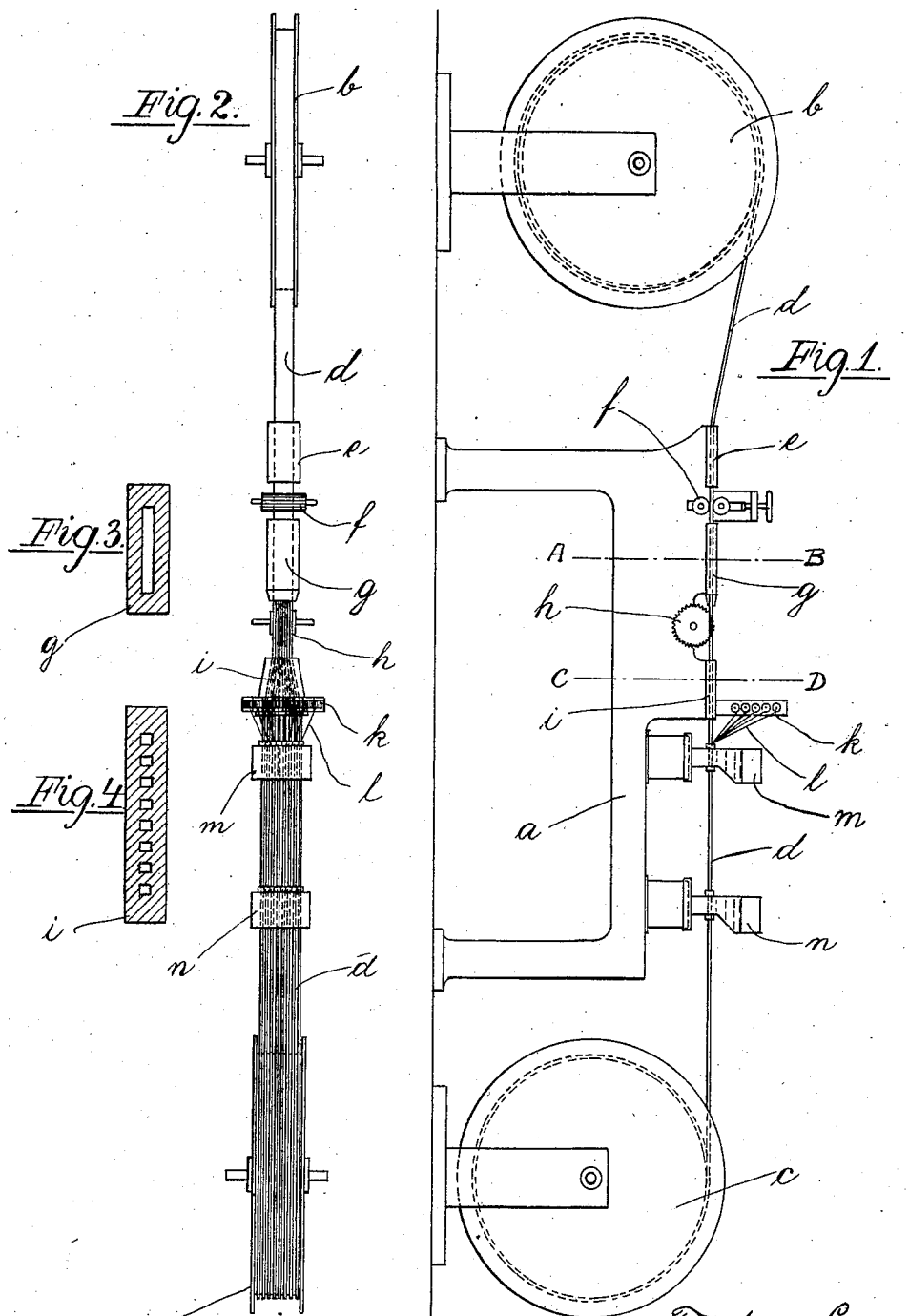
Witnesses
W. C. Healy
J. J. Sheehy Jr.
Teodor Lärn
Inventor
by James Sheehy Atty

UNITED STATES PATENT OFFICE.

TEODOR LÄRN, OF BJÖRNEBORG, RUSSIA.

METHOD OF MAKING BODIES FOR WAX MATCHES.

No. 884,506.   Specification of Letters Patent.   Patented April 14, 1908.

Application filed April 13, 1907. Serial No. 368,129.

*To all whom it may concern:*

Be it known that I, TEODOR LÄRN, residing at Björneborg, Finland, Russia, have invented new and useful Improvements in Manufacturing Bodies for Wax Matches, of which the following is a specification.

My invention pertains to what are commonly known as wax matches; and it consists in the peculiar process, hereinafter described and claimed, for expeditiously and economically producing efficient wax matches or wax match stems.

For the sake of clearness I will describe my novel process in connection with the apparatus which I prefer to employ in carrying out the process.

Referring therefore to the drawings accompanying and forming part of this specification: Figure 1 is a side elevation of the apparatus. Fig. 2 is a plan view of the same. Fig. 3 is an enlarged cross-section taken in the plane indicated by the line A—B of Fig. 1, and; Fig. 4 is an enlarged cross-section taken in the plane indicated by the line C—D of Fig. 1.

Similar letters of reference designate corresponding parts in all of the views of the drawings.

The apparatus herein illustrated is made up of a frame $a$, a drum $b$ mounted adjacent to one end of the frame, a drum $c$ located adjacent to the opposite end of the frame, a guide $e$ disposed on that end of the frame adjacent to the drum $b$, a similar guide $g$ arranged on the frame at a slight distance in advance of the guide $e$, feed rollers $f$, one of which may be driven by any suitable extraneous means, mounted on the frame at a point intermediate the guide $e$ and the guide $g$, a plurality of spaced circular saws $h$ arranged in a series extending transversely of the frame, at a point immediately in advance of the guide $g$, and designed to be rotated by any extraneous means, a guide $i$ located on the frame in advance of the saws $h$ and having a plurality of channels which diverge forward and are designed to separate the veneer strips presently described, a stand rising from the guide $i$ and carrying a plurality of bobbins $k$ from which cotton threads $l$ are designed to be drawn in the manner hereinafter described, and one or two, preferably two, receptacles $m$ and $n$, located on the frame and in advance of the guide $i$. The said receptacles are designed to contain paraffin or stearin in a melted state, and when desired suitable means may be employed for maintaining the paraffin or stearin in a heated state during the practice of my process. As shown the receptacles $m$ and $n$ are adapted for the passage through the lower portions thereof of the veneer strips, lettered $d$, and the cotton threads $l$.

Broadly speaking my novel process consists in reducing a veneer of wood to a plurality of slips or slivers, applying a thread or yarn of cotton or analogous material alongside or longitudinally of each veneer strip, and then carrying the strips and the yarns or threads, relatively arranged as stated, through a bath of paraffin or stearin or equivalent substance so as to form units calculated to be used to advantage as the stem of what is commonly known as a wax match.

In the practice of my specific process I prefer to reduce wood to a veneer of approximately two millimeters in thickness, and I then cut the veneer into ribbons of about fifty millimeters in width. These veneer ribbons are glued or otherwise connected together to form a long strip. This strip is wound upon the drum or barrel $b$, and is carried through the guide $e$, between the rollers $f$ and through the guide $g$ to the plurality of saws $h$ through the medium of which it is divided into a plurality of parallel slivers or narrow strips. These strips are then carried through the passages of the guide $i$, whereby they are spaced or separated, and then the said slivers or narrow strips are carried together with the cotton threads or yarn $l$, one of which is arranged longitudinally on each sliver or strip, through the melted paraffin or stearin in the receptacles $m$ and $n$, and then the several units each comprising a strip or sliver of veneer, a cotton thread or yarn and paraffin or stearin, are wound upon the drum or barrel $c$ from whence they may be taken at the pleasure of the party practicing the process and cut in any approved manner into lengths suitable for the stems of what are commonly known as wax matches.

It will be gathered from the foregoing that in the practice of my process there is little liability of the wood being spoiled by its division into slivers or narrow strips, and the division is attended by but little loss of wood. It will also be gathered that the use of but one thread or string in conjunction with one sliver or body of wood renders the process expeditious and cheap. This will be better appreciated when it is borne in mind that a large number of the narrow wood strips or slivers may be produced at one operation and the said strips or slivers and their accompanying strings or threads may be expeditiously carried together through the paraffin or other substance employed to join the strips or slivers and the threads or strings into units adapted for use to advantage as match stems.

I am aware of a process in which a plurality of strips of wood are surrounded by cotton precedent to being coated with wax, but such process is objectionable because it is inexpedient to apply wax to more than one body at a time, and because of the plurality of wood strips being surrounded by cotton, the application of the wax cannot be effected directly after the production of the strips of wood. I make no claim to said process, but

What I claim and desire to secure by Letters-Patent, is:

The process of producing match stems which consists in cutting a veneer of wood into a plurality of strips or slivers, then applying a thread or string of cotton or analogous material to each strip or sliver so that said threads or strings lie alongside and longitudinally of the strips or slivers, and then coating the strips or slivers and their complementary threads or strings with paraffin or equivalent substance, all in one continuous operation.

In testimony whereof I have hereunto set my hand in presence of two subscribing witnesses.

TEODOR LÄRN.

Witnesses:
   OTSART LINHMERL.
   H. STENVALLY.